(12) United States Patent
Wang

(10) Patent No.: US 11,304,480 B2
(45) Date of Patent: Apr. 19, 2022

(54) METHOD FOR ASSEMBLING SHOE COMPONENTS

(71) Applicant: Chaei Hsin Enterprise Co., Ltd., Taichung (TW)

(72) Inventor: Shui-Mu Wang, Taichung (TW)

(73) Assignee: CHAEI HSIN ENTERPRISE CO., LTD., Taichung (TW)

( * ) Notice: Subject to any disclaimer, the term of this patent is extended or adjusted under 35 U.S.C. 154(b) by 49 days.

(21) Appl. No.: 17/089,581

(22) Filed: Nov. 4, 2020

(65) Prior Publication Data
US 2021/0068504 A1    Mar. 11, 2021

Related U.S. Application Data

(62) Division of application No. 16/232,155, filed on Dec. 26, 2018, now Pat. No. 10,945,493.

(30) Foreign Application Priority Data

Apr. 2, 2018    (TW) .................. 107111673

(51) Int. Cl.
*A43D 3/04*     (2006.01)
*A43D 25/06*    (2006.01)
(Continued)

(52) U.S. Cl.
CPC ................ *A43D 3/04* (2013.01); *A43D 3/02* (2013.01); *A43D 3/026* (2013.01); *A43D 3/1408* (2013.01);
(Continued)

(58) Field of Classification Search
CPC . A43D 3/04; A43D 3/02; A43D 3/026; A43D 3/1408; A43D 11/04; A43D 11/12;
(Continued)

(56) References Cited

U.S. PATENT DOCUMENTS 1,825,276 A    9/1931    Hollier
2,247,818 A    7/1941    Nast
(Continued)

FOREIGN PATENT DOCUMENTS

CN    105072943 B    6/2017
JP    2012-504511 A   2/2012
(Continued)

OTHER PUBLICATIONS

Search Report appended to an Office Action, which was issued to Taiwanese counterpart application No. 107111673 by the TIPO dated Sep. 17, 2018, with an English translation thereof.
(Continued)

*Primary Examiner* — Ted Kavanaugh
(74) *Attorney, Agent, or Firm* — Hamre, Schumann, Mueller & Larson, P.C.

(57) ABSTRACT

A method for assembling shoe components includes the steps of: providing at least two shoe components, a shoe last and a film unit; placing the at least two shoe components on an outer surface of the shoe last; removably covering an assembly of the at least two shoe components and the shoe last with the film unit such that the film unit and the shoe last cooperatively define a confining space therebetween; and pumping air out of the confining space and heating the at least two shoe components to shrink and deform the film unit so as to press the at least two shoe components to adhere tightly to each other.

3 Claims, 10 Drawing Sheets

(51) Int. Cl.
*A43D 63/00* (2006.01)
*A43D 86/00* (2006.01)
*A43D 3/02* (2006.01)
*A43D 25/07* (2006.01)
*B29C 51/10* (2006.01)
*A43D 3/14* (2006.01)
*A43D 11/04* (2006.01)
*A43D 11/12* (2006.01)

(52) U.S. Cl.
CPC .............. *A43D 11/04* (2013.01); *A43D 11/12* (2013.01); *A43D 25/06* (2013.01); *A43D 25/07* (2013.01); *A43D 63/00* (2013.01); *A43D 86/00* (2013.01); *B29C 51/10* (2013.01); *A43D 2200/50* (2013.01)

(58) Field of Classification Search
CPC ........ A43D 25/06; A43D 25/07; A43D 63/00; A43D 86/00; A43D 2200/50
See application file for complete search history.

(56) References Cited

U.S. PATENT DOCUMENTS

| | | | |
|---|---|---|---|
| 2,283,946 A | 5/1942 | Pitman | |
| 3,160,899 A | 12/1964 | Bille et al. | |
| 3,512,197 A | 5/1970 | Carr, Sr. | |
| 10,945,493 B2 * | 3/2021 | Wang | A43D 3/04 |
| 2014/0223671 A1 | 8/2014 | Fisher et al. | |
| 2014/0237738 A1 | 8/2014 | Johnson et al. | |
| 2014/0237853 A1 | 8/2014 | Fisher et al. | |
| 2015/0342296 A1 | 12/2015 | Skaja et al. | |
| 2016/0021973 A1 | 1/2016 | Ferniani et al. | |
| 2016/0059533 A1 | 3/2016 | Hull et al. | |
| 2018/0153265 A1 | 6/2018 | Jeandin et al. | |

FOREIGN PATENT DOCUMENTS

| | | |
|---|---|---|
| TW | M240108 U | 8/2004 |
| TW | 201808592 A | 3/2018 |

OTHER PUBLICATIONS

Search Report and Written Opinion issued to Singapore counterpart application No. 10201811617T by the IPOS dated Sep. 20, 2019.
Search Report issued to European counterpart application No. 18248020.2 by the EPO dated Jul. 12, 2019.
Examination Report issued to Indian counterpart application No. 201914000345 by the IPI dated Jul. 21, 2020.
Examination Report issued to GCC counterpart application No. 2019/37043 by the GCC Patent Office dated Jul. 3, 2020.
Examination Report issued to Australian counterpart application No. 2018282474 by the IP Australia dated Nov. 28, 2019.
Office Action issued to Japanese counterpart application No. 2019-14136 by the Japan Patent Office dated Feb. 4, 2020.
Office Action issued to Korean counterpart application No. 10-2019-0019675 by the KIPO dated Feb. 19, 2020.
Office Action issued to Canadian counterpart application No. 3028660 by the CIPO dated Jan. 21, 2020.

* cited by examiner

METHOD FOR ASSEMBLING SHOE COMPONENTS

CROSS-REFERENCE TO RELATED APPLICATION

This application claims priority to Taiwanese Invention Patent Application No. 107111673, filed on Apr. 2, 2018.

FIELD

The disclosure relates to a method and an apparatus for assembling shoe components.

BACKGROUND

A shoe is mainly composed of shoe components, such as an upper and a sole, and may further include other shoe components, such as a reinforcing member, an eyestay, a tongue, a decorative piece, etc. These shoe components are usually bonded by hot pressing adhesive. However, if the hot pressing adhering process is done manually, not only is the quality difficult to stabilize, but also the process is time consuming, so that the cost of assembly is increased.

Referring to FIG. 1, a system 1 for applying heat, and pressure to a three-dimensional article, as disclosed in Chinese Patent Publication No. 107518525, mainly includes an intermediate member 11 and a base member 12 oppositely connected to each other and cooperatively defining an airtight space 13 for receiving a footwear unit 2. The intermediate member 11 has a flexible film 111 for covering the footwear unit 2. External pressure (for example, vacuum pressure) may be applied to the flexible film 111 so that the footwear unit 2 may be pressed by the flexible film 111 and be integrally connected.

Although the aforesaid system 1 can improve the deficiencies found in manually making the shoe, if still has the following drawbacks:

1. Since air in the airtight space 13 is discharged through a hole (not shown) in the base member 12, the position of the footwear unit 2 on the base member 12 should not block the hole, so that the placement of the footwear unit 2 on the base member 12 is restricted.

2. In the processing method of the system 1, there is need to wait for the footwear unit 2 to finish adhering and then remove from the base member 12 before the next process may be performed, so that the process efficiency thereof is limited.

3. To construct the airtight space 13, the base member 12 and the intermediate member 11 must be provided, so that the structure of the system 1 is not only complicated, but the cost thereof is also increased.

SUMMARY

Therefore, an object of the present disclosure is to provide a method and an apparatus for assembling shoe components that can alleviate at least one of the drawbacks of the prior art.

According to one aspect of this disclosure, a method for assembling shoe components includes the steps of: providing at least two shoe components, a shoe last and a film unit, at least one of the at least two shoe components having an adhesive layer; placing the at least two shoe components on an outer surface of the shoe last; removably covering an assembly of the at least two shoe components and the shoe last with the film unit such that, the film unit and the shoe last cooperatively define a confining space therebetween; and pumping air out of the confining space and heating the at least two shoe components to shrink and deform the film unit so as to press the at least two shoe components to adhere tightly to each other.

According to another aspect of this disclosure, an apparatus for assembling at least two shoe components includes a shoe last, a film unit, a vacuum unit and a heating unit. The shoe last has a shoe last body for placing of the at least two shoe components on an outer surface thereof. The film unit is provided for removably covering an assembly of the shoe last and the at least two shoe components, and cooperates with the shoe last to define a confining space therebetween. The vacuum unit is provided for pumping air out of the confining space to shrink and deform the film unit for pressing the at least two shoe components tightly to each other. The heating unit is used for heating the at least two shoe components so as to adhere the at least two shoe components tightly to each other.

BRIEF DESCRIPTION OF THE DRAWINGS

The features and advantages of the disclosure will become apparent in the following detailed description of the embodiments with reference to the accompanying drawings, of which.

DETAILED DESCRIPTION

Figure 1:
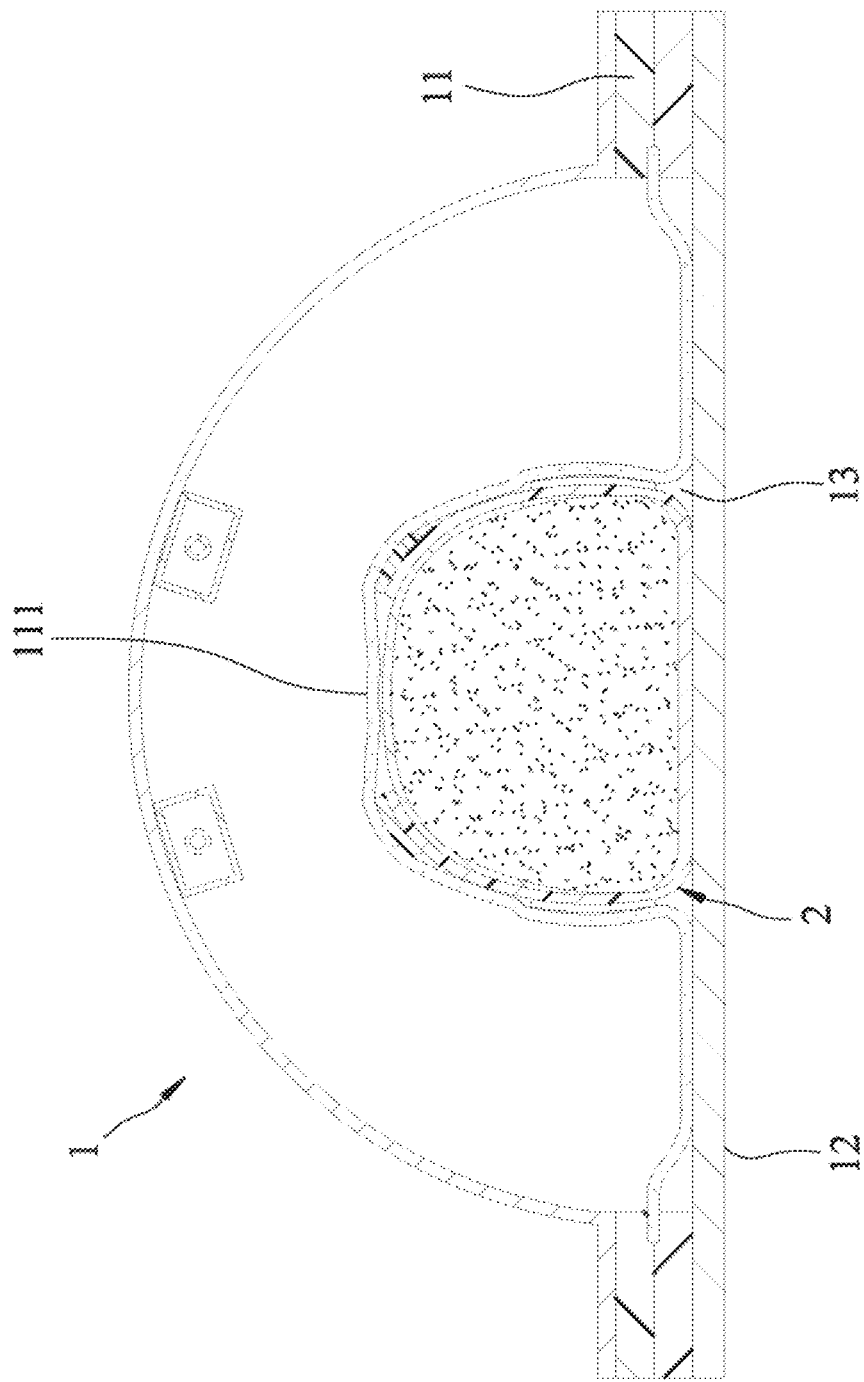
FIG. 1 is a sectional view of a system for applying heat and pressure to a three-dimensional article disclosed in Chinese Patent Publication No. 107518525.

Before the present disclosure is described in greater detail with reference to the accompanying embodiments, it should be noted herein that like elements are denoted by the same reference numerals throughout the disclosure.

Figure 2:
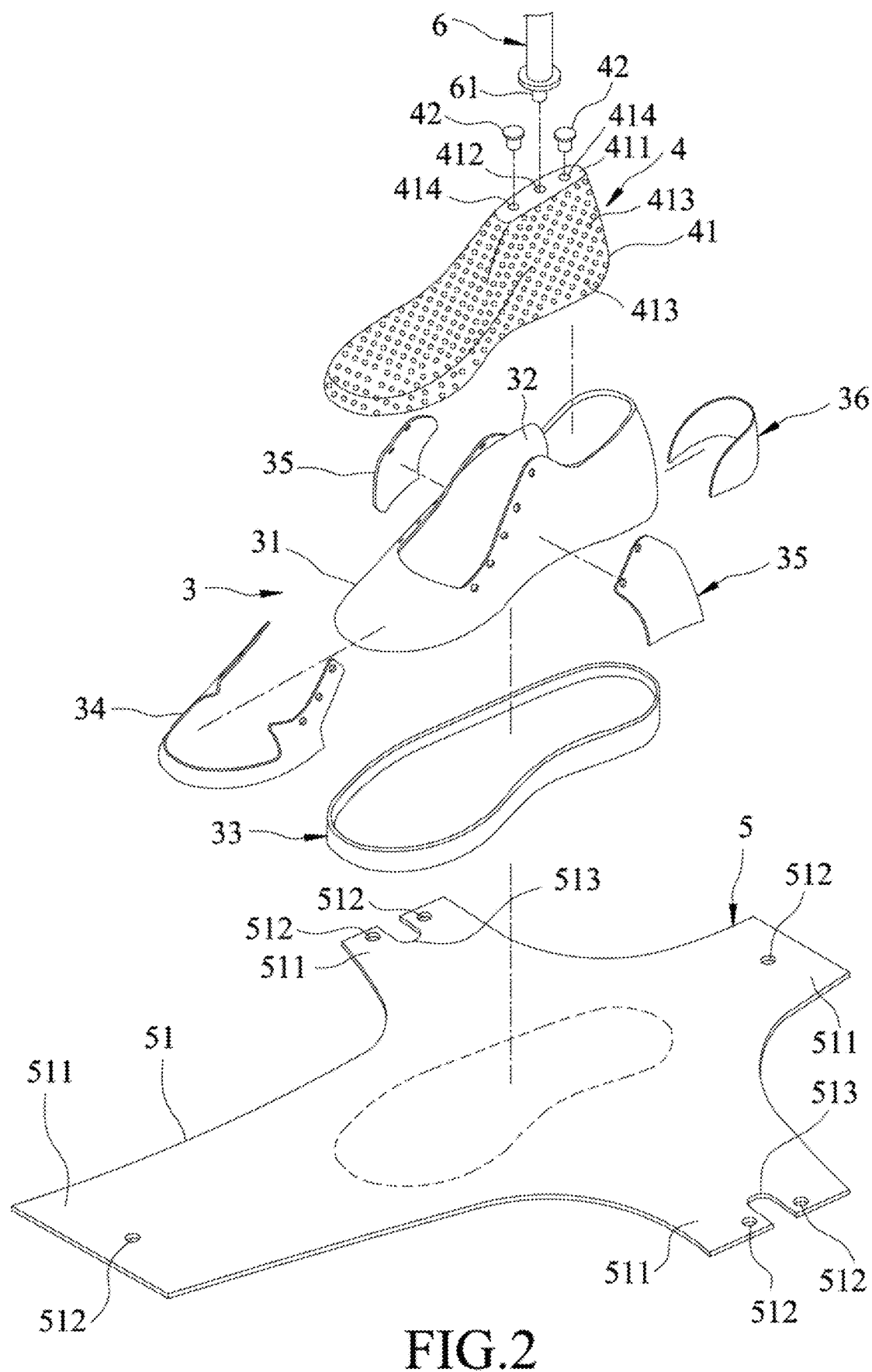
FIG. 2 is an exploded perspective view of an apparatus for assembling shoe components according to the first embodiment of this disclosure and the shoe components.
Figure 3:
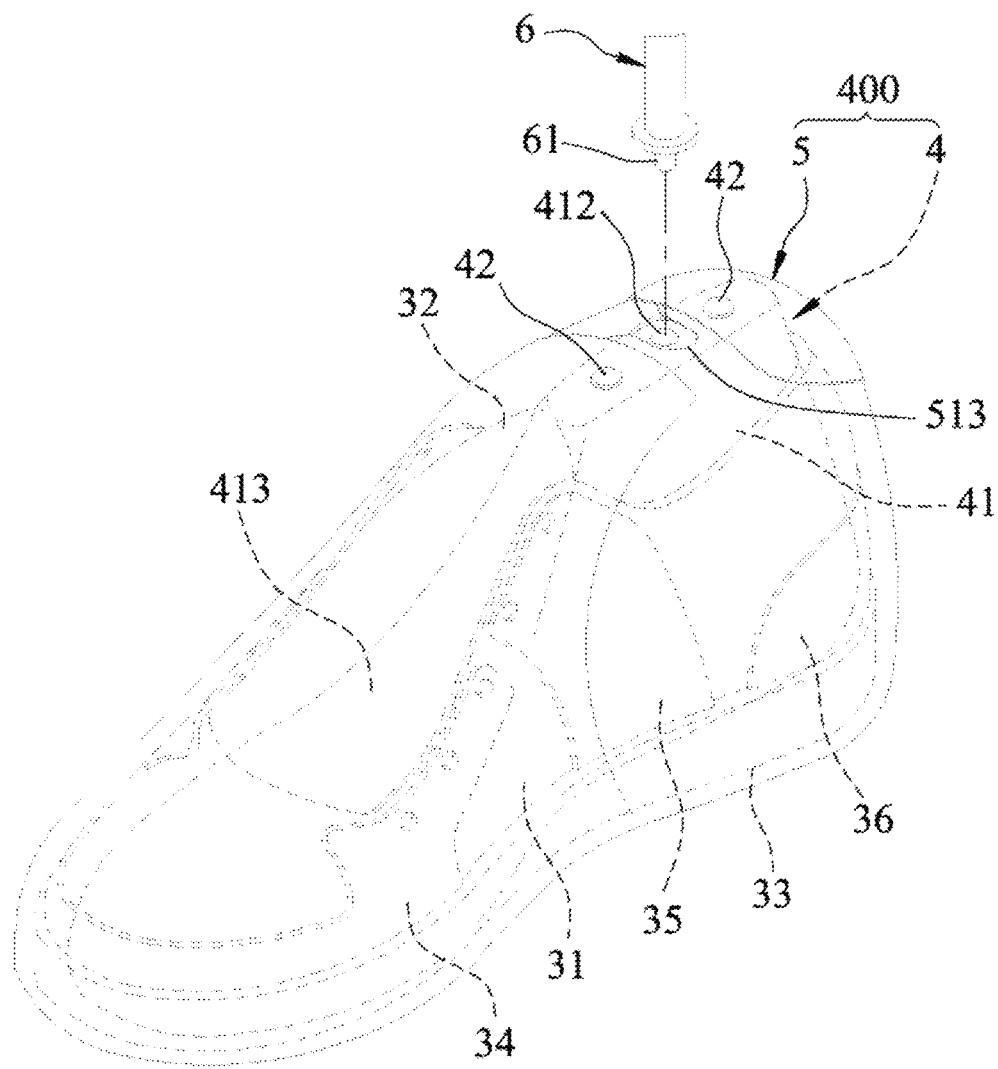
FIG. 3 illustrates a film unit of the first embodiment covering an assembly of a shoe last and the shoe components.
Figure 4:
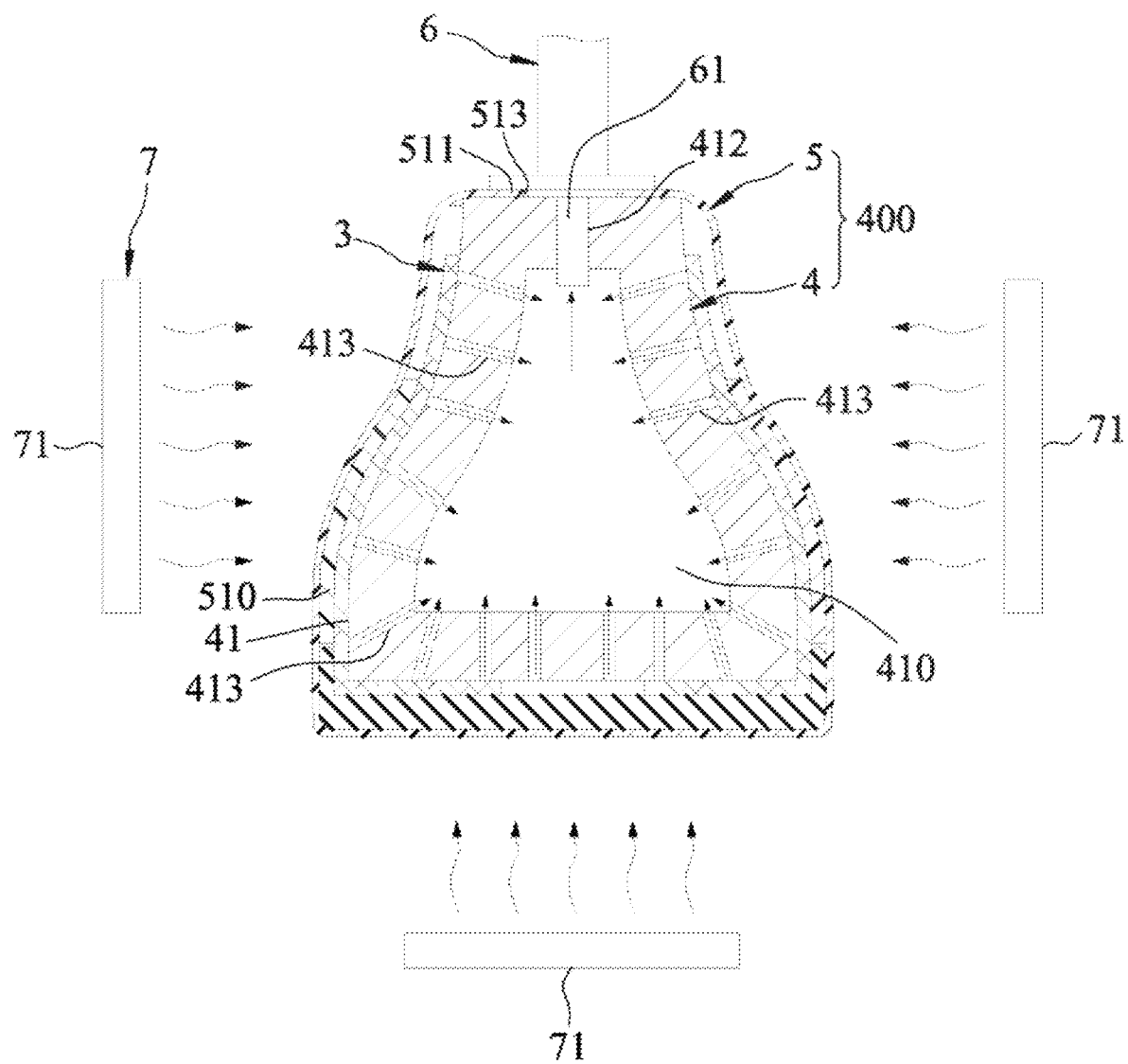
FIG. 4 is a sectional view of the first embodiment.
Figure 6:
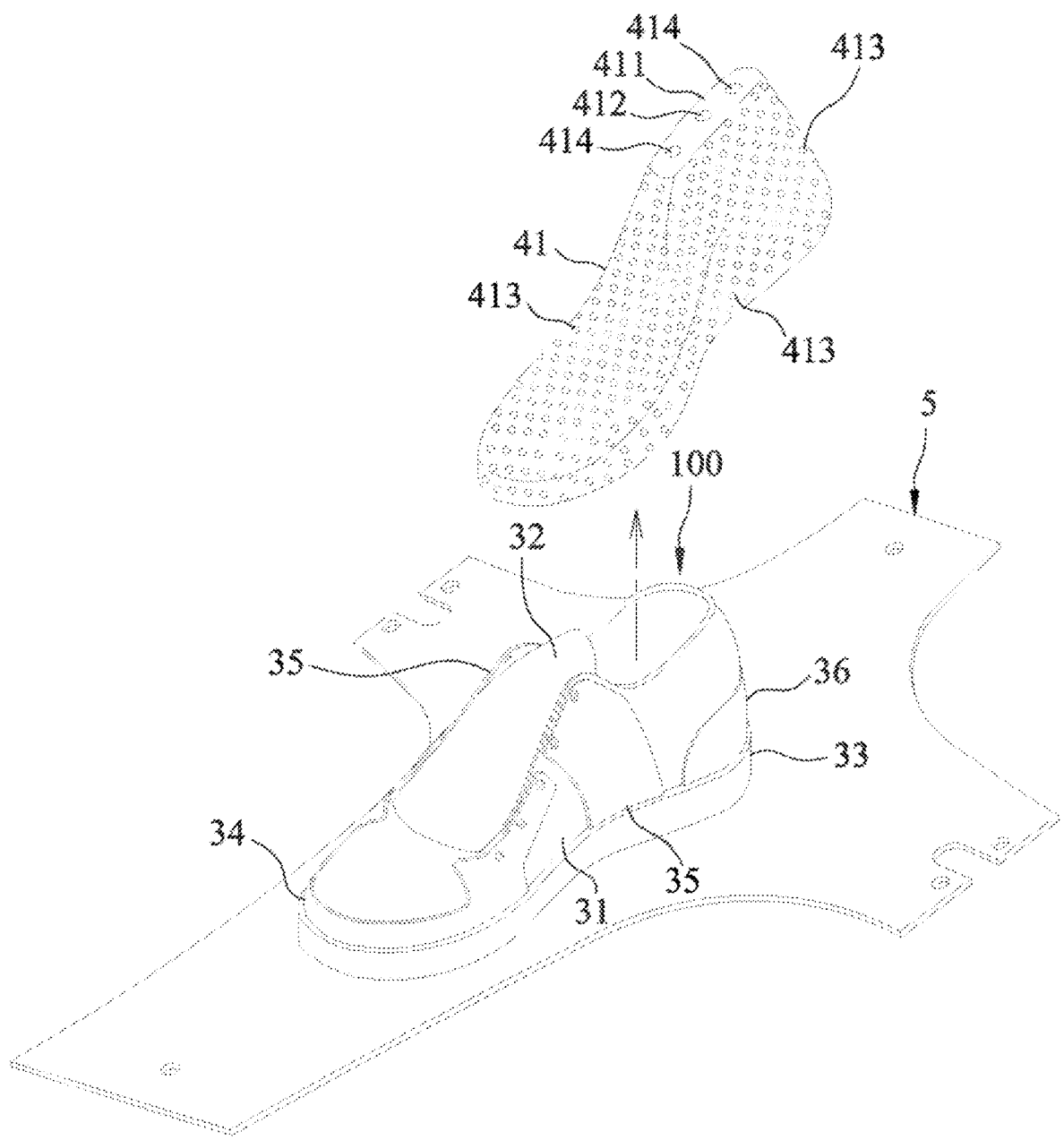
FIG. 6 illustrates the shoe last and the film unit, being removed after the shoe components are assembled.

Referring to FIGS. 2 to 4, an apparatus according to the first embodiment of the present disclosure is configured to assemble a plurality of shoe components 3 so as to form a shoe 100 (see FIG. 6). In this embodiment, the shoe components 3 are exemplified to include an upper 31, a tongue 32, a sole 33, an eyestay 34, a pair of reinforcing members 35, and a decorative member 36. The apparatus of this embodiment includes an airtight unit 400, a vacuum unit 6 and a heating unit 7.

The airtight unit 400 includes a shoe last 4 and a film unit 5. The shoe last 4 has a shoe last body 41 defining a cavity 410. The shoe last body 41 has an air port 412 formed in a top end surface 411 thereof and communicating with the cavity 410, a plurality of vent holes 413 communicating with the air port 412 through the cavity 410, and two positioning portions 414 formed on the top end surface 411 and located on two opposite sides of the air port 412. In this embodiment, each positioning portion 414 is a recessed hole. The shoe components 3 are placed on an outer surface of the shoe last body 41 at predetermined positions.

The film unit 5 of this embodiment includes a flexible air barrier film 51 for removably covering an assembly of the shoe last body 41 and the shoe components 3. The air barrier film 51 cooperates with the shoe last body 41 to define a confining space 510 therebetween, and includes four covering portions 511 formed on front, rear, left and right sides thereof and overlapping each other on the top end surface 411 of the shoe last body 41, and six fixed portions 512 formed on the covering portions 511. The confining space 510 communicates with the vent holes 413, and also communicates with the cavity 410 and the air port 412 through the vent holes 413. Each of the left and right covering portions 511 is formed with two fixed portions 512 corresponding to the positioning portions 414, and a notch 513 between the fixed portions 512 and corresponding to the air port 412. Each of the front and rear covering portions 511 is formed with one fixed portion 512 corresponding to one of the positioning portions 414. In this embodiment, each fixed portion 512 is a through hole.

Two fixing elements 42 are used to fix the covering portions 511 of the air barrier film 51 to the top end surface 411 of the shoe last body 41. In this embodiment, each fixing element 42 is a bolt. The bolts or fixing elements 42 are extended through the through holes or fixed portions 512 of the overlapped covering portions 511 and are press-fitted into the respective positioning portions 414 of the shoe last body 41.

It should be noted herein that the number of the fixed portions 512 is not limited to six, and may be four in other embodiment, but is not limited thereto.

The vacuum unit 6 of this embodiment is a vacuum pump having an air nozzle 61 removably connected to the air port 412 of the shoe last body 41. The air nozzle 61 communicates with the confining space 510 through the air port 412 and the vent holes 413 for pumping air out of the confining space 510.

The heating unit 7 is provided to transmit heat to the shoe components 3 so as to adhere the shoe components 3 tightly to each other. In this embodiment, the heating unit 7 includes four heaters 71 (only three are shown in FIG. 4) disposed around an outer side of the film unit 5. It should be noted herein that the heating unit 7 is not limited to being disposed on the outer side of the film unit 5. In other embodiment, the heating unit 7 may be a heating tube provided on the shoe last, body 41, and is not limited thereto.

Figure 5:
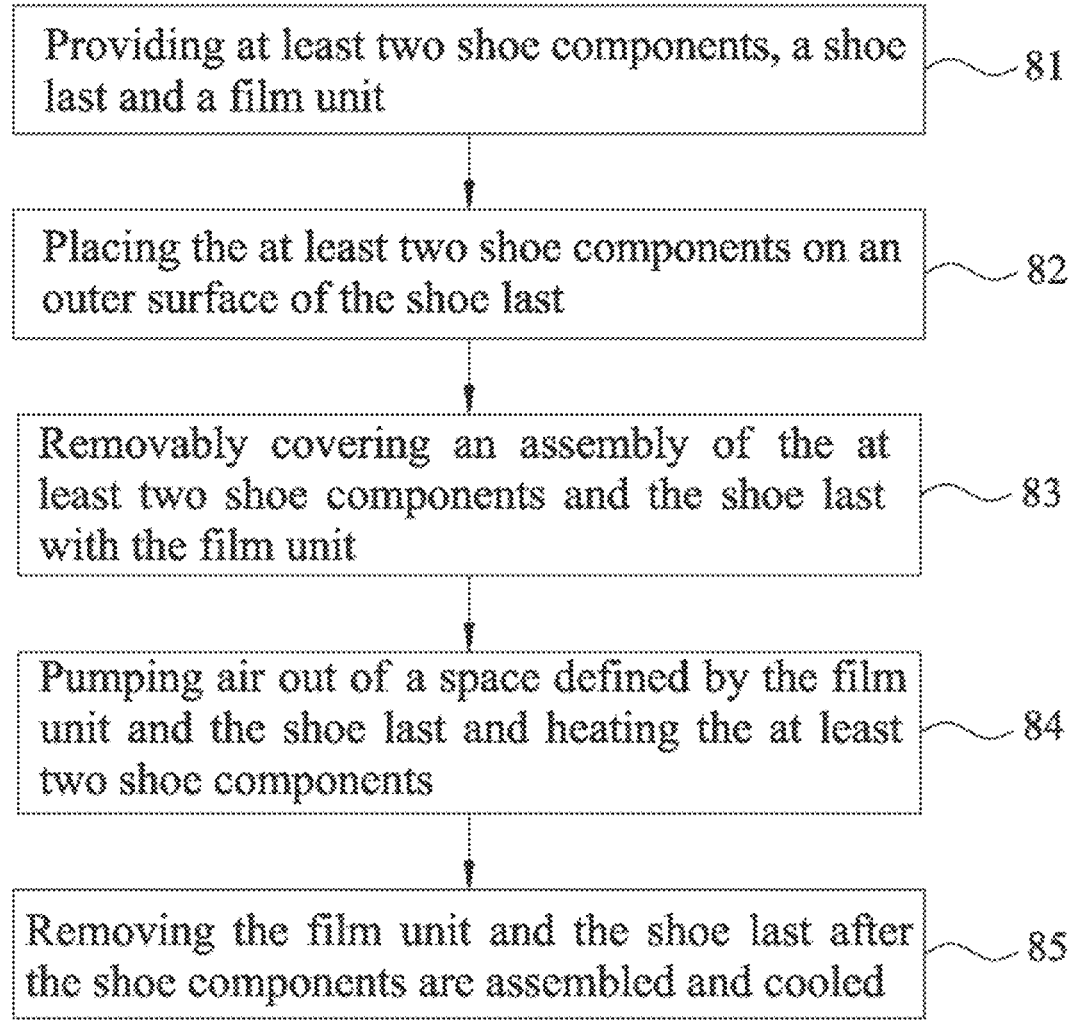
FIG. 5 is a flow diagram, illustrating the steps involved in a method of the first embodiment for assembling shoe components.

Referring to FIG. 5, in combination with FIGS. 2 to 4, a method tor assembling the shoe components 3 using the apparatus of the first embodiment includes steps 81 to 85.

In step 81, the shoe components 3, the shoe last 4 and the film unit 5 are provided. The shoe components 3 are exemplified to include the upper 31, the tongue 32, the sole 33, the eyestay 34, the pair of reinforcing members 35 and the decorative member 36.

In step 82, the shoe components 3 are placed on the outer surface of the shoe last body 41 at the predetermined positions. Each shoe component 3 has an adhesive layer. The upper 31 is first placed on the outer surface of the shoe last body 41, followed by the tongue 32, the sole 33, the eyestay 34, the reinforcing members 35 and the decorative member 36.

In step 83, the assembly of the shoe last body 41 and the shoe components 3 are placed on top of the air barrier film 51, and the four covering portions 511 of the air barrier film 51 are folded toward the top end surface 411 of the shoe last body 41 to overlap each other with the left and right covering portions 511 at the bottom, the rear covering portion 511 at the top, and the front covering portion 511 below the rear covering portion 511 but on top of the left and right covering portions 511. At this time, the fixed portions 512 of the covering portions 511 face the cor responding positioning portions 414. Two fixing elements 42 are then inserted through the fixed portions 512 of the covering portions 511, and are press-fitted into the respective positioning portions 414, thereby fixing the air barrier film 51 to the shoe last body 41. The air barrier film 51 cooperates with the shoe last body 41 to define the confining space 510 at this time.

In step 84, the air nozzle 61 of the vacuum unit 6 is connected to the air port 412 of the shoe last body 41, and the heaters 71 are activated to transmit heat to the shoe components 3. Through this, the air in the confining space 510 is sucked by the air nozzle 61 and is discharged through the air port 412 after passing through the vent holes 413 and the cavity 410 of the shoe last body 41, and the air barrier film 51 is shrunk and deformed under the action of negative pressure, so that the shoe components 3 are pressed to adhere tightly to each other.

In step 85, after the shoe components 3 are assembled and cooled, the fixing elements 42 are removed from the respective positioning portions 414, and the shoe last body 41 and the air barrier film 51 are detached from the assembled shoe components 3, as shown in FIG. 6. The shoe 100 is obtained in this embodiment.

It is worth to mention herein that a step of injecting air (not shown) may be performed after step 34 and before step 85. High pressure air may be injected into the cavity 410 through the connection of the air nozzle 61 of the vacuum unit 6 with the air port 412, and may pass through the vent holes 413 toward the shoe components 3. Through this, the air barrier film 51 may be quickly cooled and detached from the shoe components 3, and the shoe last 4 may be easily removed from the shoe 100.

Figure 7:
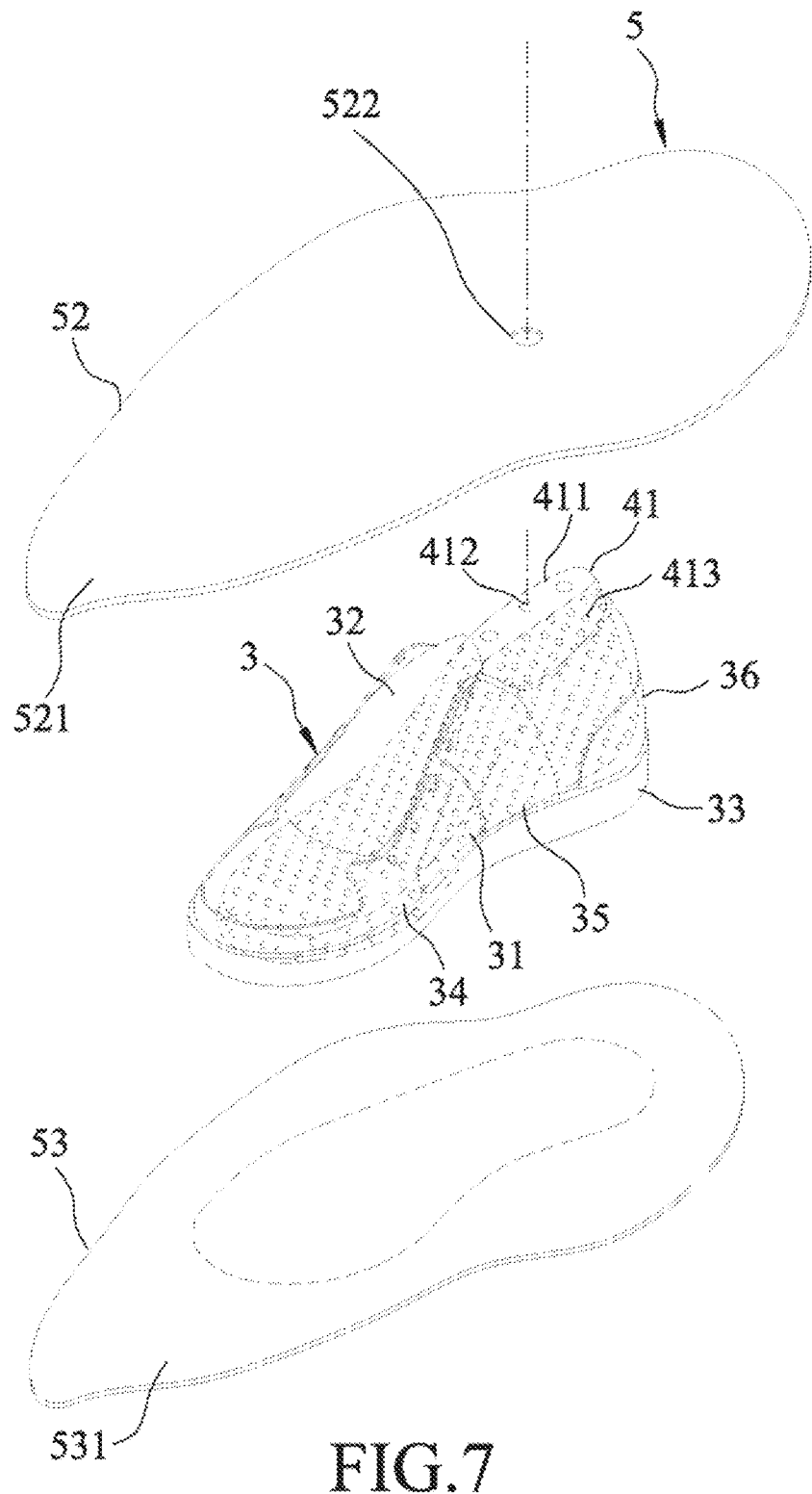
FIG. 7 is an exploded perspective view of a film unit of an apparatus for assembling shoe components according to the second embodiment of this disclosure and an assembly of a shoe last and shoe components.
Figure 8:
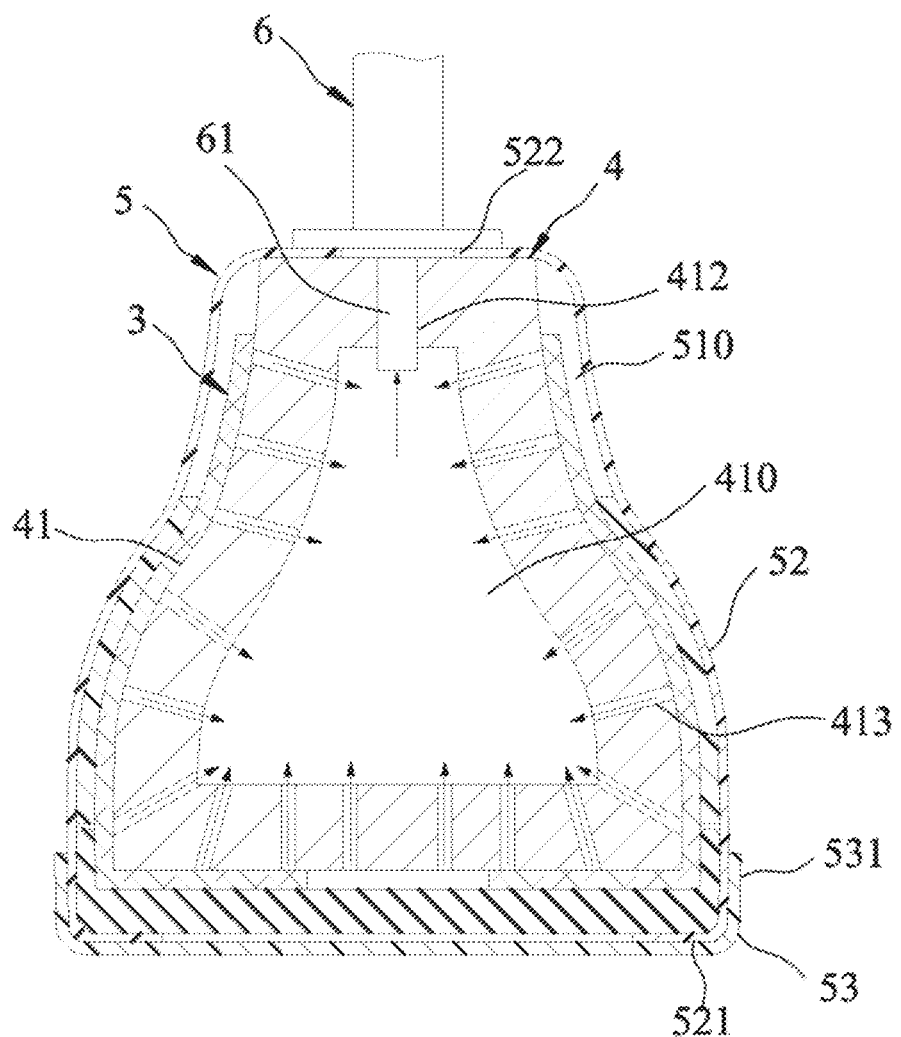
FIG. 8 is an assembled sectional view of the second embodiment.

Referring to FIGS. 7 and 8, the second embodiment of the apparatus and the method of this disclosure are generally identical to the first embodiment. However, in this embodiment, the film unit 5 includes two flexible air barrier films 52, 53 having peripheral ends 521, 531. The air barrier film 52 further has a through hole 522 corresponding to the air port 412 of the shoe last body 41.

In step 83, the air barrier films 52, 53 are disposed opposite to each other to removably cover the assembly of the shoe last body 41 and the shoe components 3 therebetween with the peripheral ends 521, 531 thereof overlapping each other. The air barrier films 52, 53 cooperate with the shoe last body 41 to define the confining space 510 at this time.

In step 84, the air nozzle 61 of the vacuum unit 6 is inserted through the through hole 522 in the air barrier film 52 and is removably connected to the air port 412 of the shoe last body 41, and the heaters 71 (see FIG. 4) are activated to transmit heat to the shoe components 3. Through this, the air in the confining space 510 is sucked by the air nozzle 61 and is discharged through the air port 412 after passing through the vent holes 413 and the cavity 410 of the shoe last body 41, and the air barrier films 52, 53 are shrunk and deformed under the action of negative pressure, so that the shoe components 3 are pressed to adhere tightly to each other so as to form the shoe 100 (see FIG. 6).

In step 85, after the shoe components 3 are assembled and cooled, the overlapped peripheral ends 521, 531 of the air barrier films 52, 53 are separated from each other to detach the air barrier films 52, 53 from the assembled shoe components 3, and the shoe last body 41 is also detached from the assembled shoe components 3.

Figure 9:
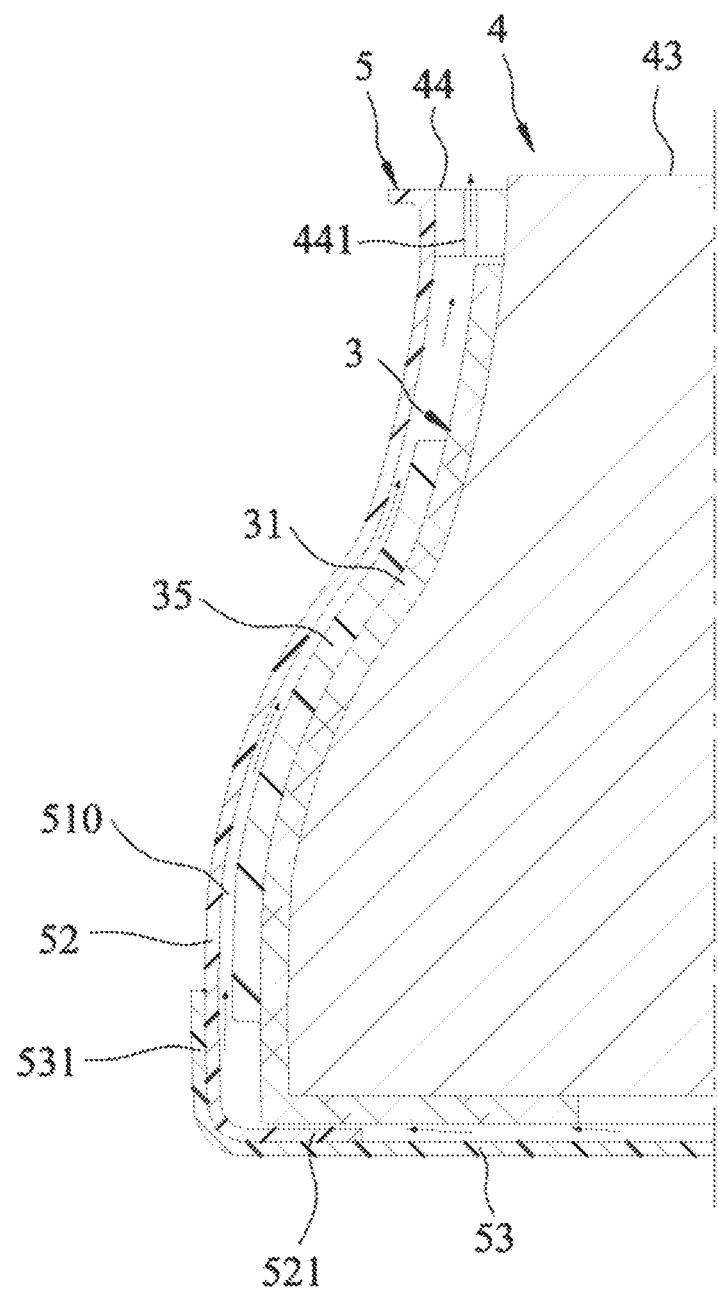
FIG. 9 is a fragmentary sectional view of an apparatus for assembling shoe components according to the third embodiment of this disclosure.
Figure 10:
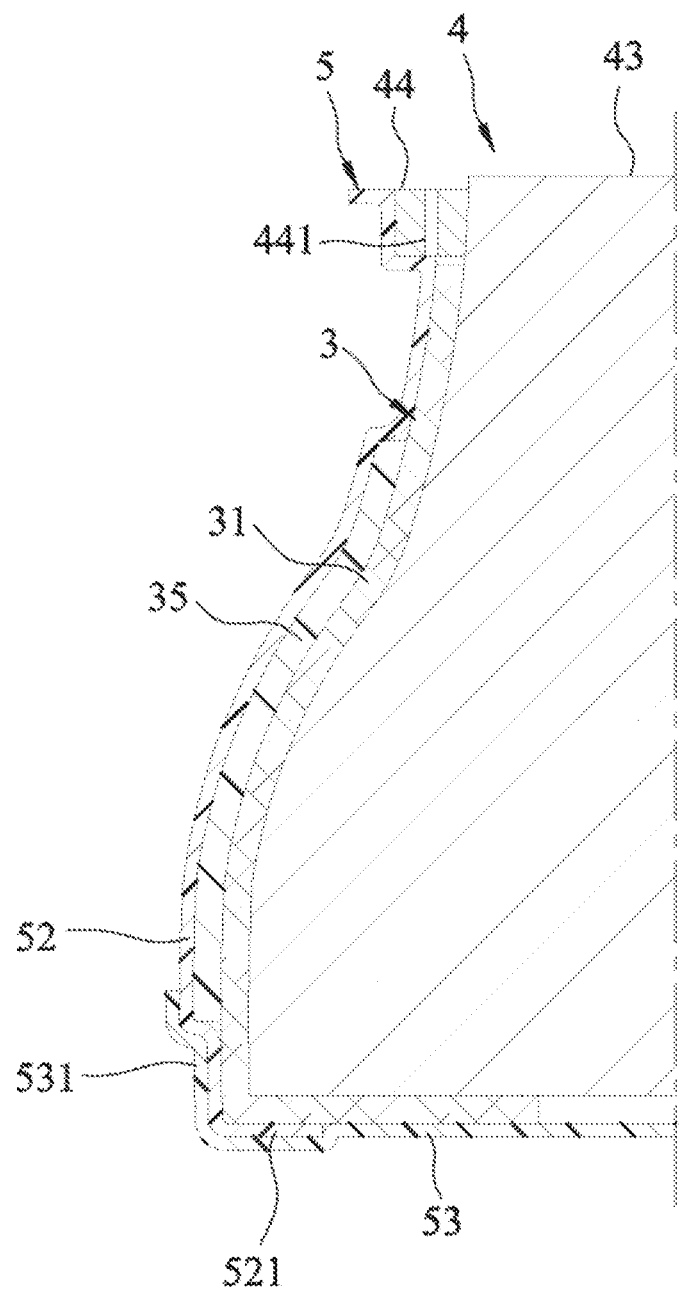
FIG. 10 is a view similar to FIG. 9, but with air being pumped out of a confining space.

Referring to FIGS. 9 and 10, the third embodiment of the apparatus and the method of this disclosure are generally identical to the second embodiment. However, in this embodiment, the apparatus is exemplified to assemble the upper 31 and the pair of reinforcing members 35 (only one reinforcing member 35 is shown). Further, the shoe last body 43 of the shoe last 4 has a solid structure. The shoe last 4 further has a spacer portion 44 formed around the outer surface of the shoe last body 43 in proximity to a top end thereof and cooperating with the shoe last body 43 and the film unit 5 to define the confining space 510. The spacer portion 44 has an air port 441 communicating with the confining space 510. The air nozzle 61 of the vacuum unit 6 (see FIG. 2) is removably connected to the air port 441 for pumping air out of the confining space 510.

In step 82, the upper 31 is first placed on the outer surface of the shoe last body 43, after which the pair of reinforcing members 35 are placed on two opposite sides of the upper 31.

In step 83, the air barrier film 32 is sleeved around the assembly of the shoe last body 41, the upper 31 and the reinforcing members 35, and the air barrier film 53 is disposed opposite to the air barrier film 52 and cooperate with the same to removably cover the assembly of the shoe last body 43, the upper 31 and the reinforcing members 35 therebetween with the peripheral ends 521, 531 thereof overlapping each other. The air barrier films 52, 53 cooperate with the shoe last body 43 and the spacer portion 44 to define the confining space 510 at this time.

In step 84, the air nozzle 61 of the vacuum unit 6 (see FIG. 8) is removably connected to the air port 441, and the heaters 71 (see FIG. 4) are activated to transmit heat to the upper 31 and the reinforcing members 35. Through this, the air in the confining space 510 is sucked by the air nozzle 61 and is discharged through the air port 441, and the air barrier films 52, 53 are shrunk and deformed under the action of negative pressure, as shown in FIG. 10, so that the upper 31 and the reinforcing members 35 are pressed to adhere tightly to each other.

The advantages of this disclosure can be summarized as follows:

1. The confining space 510 is defined by the shoe last body 41 and the film unit 5 in the first and second embodiments, and is defined by the shoe last body 43, the film unit 5 and the spacer portion 44 in the third embodiment. Further, the air port 412, 441 may be formed in the shoe last body 41 or the spacer portion 44. Thus, the placement position of the shoe last 4 on the film unit 5 is not restricted, and has more freedom in the use of space and process.

2. This disclosure may use one vacuum unit 6 and one heating unit 7 to press and heat a plurality of airtight units 400. That is, after one of the airtight units 400 is pressed and heated, the vacuum unit 6 may be removed, followed by the film unit 5, so that the pressing and heating of another one of the airtight units 400 may proceed, thereby greatly increasing the production efficiency of the disclosure.

3. Since the shoe last 4 is an essential component fox shoemaking, the components of this disclosure can be simplified, thereby effectively reducing the equipment cost.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for assembling shoe components, comprising:
    providing at least two shoe components, a shoe last and a film unit, at least one of the at least two shoe components having an adhesive layer, the shoe last having a shoe last body, the film unit including at least one flexible air barrier film;
    placing the at least two shoe components on an outer surface of the shoe last body;
    removably covering an assembly of the at least two shoe components and the shoe last with the at least one flexible air barrier film such that the at least one flexible air barrier film and the shoe last cooperatively define a confining space therebetween; and
    pumping air out of the confining space and heating the at least two shoe components to shrink and deform the at least one flexible air barrier film so as to press the at least two shoe components to adhere tightly to each other;
    wherein the shoe last body is formed with an air port and a plurality of vent holes communicating with the air port and the confining space, the air port being configured for pumping the air out of the confining space through the vent holes; and
    wherein the at least one flexible air barrier film has a through hole corresponding to the air port in of the shoe last body.

2. The method as claimed in claim 1, wherein the film unit includes two opposite flexible air barrier films removably covering the assembly of the at least two shoe components and the shoe last therebetween, the flexible air barrier films having peripheral ends overlapping each other.

3. The method as claimed in claim 1, wherein the air port is formed on an end surface of the shoe last body, the shoe last body having two positioning portions formed on the end surface thereof and located on two opposite sides of the air port.

* * * * *